US011869518B2

(12) United States Patent
Norvell et al.

(10) Patent No.: US 11,869,518 B2
(45) Date of Patent: *Jan. 9, 2024

(54) METHOD AND APPARATUS FOR INCREASING STABILITY OF AN INTER-CHANNEL TIME DIFFERENCE PARAMETER

(71) Applicant: Telefonaktiebolaget LM Ericsson (publ), Stockholm (SE)

(72) Inventors: Erik Norvell, Stockholm (SE); Tomas Jansson Toftgård, Uppsala (SE)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,499

(22) Filed: Jun. 16, 2022

(65) Prior Publication Data

US 2022/0392463 A1 Dec. 8, 2022

Related U.S. Application Data

(63) Continuation of application No. 17/066,541, filed on Oct. 9, 2020, now Pat. No. 11,380,337, which is a (Continued)

(51) Int. Cl.

*G10L 19/008* (2013.01)
*G10L 19/26* (2013.01)
*G10L 21/0308* (2013.01)

(52) U.S. Cl.

CPC .......... *G10L 19/008* (2013.01); *G10L 19/265* (2013.01); *G10L 21/0308* (2013.01)

(58) Field of Classification Search

CPC ..... G10L 19/008; G10L 19/265; G10L 19/26; G10L 21/0308; G10L 25/06

See application file for complete search history.

(56) References Cited

U.S. PATENT DOCUMENTS

2011/0206209 A1* 8/2011 Ojala .................... G10L 19/008 381/1
2013/0301835 A1* 11/2013 Briand ...................... H04S 7/00 381/17
2013/0304481 A1* 11/2013 Briand .................. G10L 19/008 704/500

FOREIGN PATENT DOCUMENTS

EP 2 381 439 10/2011
WO 2013149672 10/2013

OTHER PUBLICATIONS

Faller et al., "Improved Time Delay Analysis/Synthesis for Parametric Stereo Audio Coding", AES Convention 120 (May 1, 2006), XP040507647. (9 pages).

(Continued)

*Primary Examiner* — Huyen X Vo

(74) *Attorney, Agent, or Firm* — Rothwell, Figg, Ernst & Manbeck, P.C.

(57) ABSTRACT

A method for increasing stability of an inter-channel time difference (ICTD) parameter in parametric audio coding, wherein a multi-channel audio input signal comprising at least two channels is received. The method comprises obtaining an ICTD estimate, $ICTD_{est}(m)$, for an audio frame m and a stability estimate of said ICTD estimate, and determining whether the obtained ICTD estimate, $ICTD_{est}(m)$, is valid. If the $ICTD_{est}(m)$ is not found valid, and a determined sufficient number of valid ICTD estimates have been found in preceding frames, a hang-over time is determined using the stability estimate and a previously obtained valid ICTD parameter, ICTD(m−1), is selected as an output parameter, ICTD(m), during the hang-over time. The output parameter, ICTD(m), is set to zero if valid $ICTD_{est}(m)$ is not found during the hang-over time.

18 Claims, 9 Drawing Sheets

Related U.S. Application Data continuation of application No. 16/082,137, filed as application No. PCT/EP2017/055430 on Mar. 8, 2017, now Pat. No. 10,832,689.

(60) Provisional application No. 62/305,683, filed on Mar. 9, 2016.

(56) References Cited

OTHER PUBLICATIONS

Faller et al., “Parametric Multichannel Audio Coding:Synthesis of Coherence Cues”, IEEE Transactions on Audio, Speech, and Language Processing, vol. 14., No. 1 (Jan. 2006). (12 pages).

International Search Report and Written Opinion dated Apr. 24, 2017 issued in International Application No. PCT/EP2017/055430. (10 pages).

Extended European Search Report issued in European Application No. 19 18 9961, dated Sep. 5, 2019 (8 pages).

* cited by examiner

METHOD AND APPARATUS FOR INCREASING STABILITY OF AN INTER-CHANNEL TIME DIFFERENCE PARAMETER

CROSS-REFERENCE TO RELATED APPLICATIONS

This application is a continuation of U.S. application Ser. No. 17/066,541, filed on Oct. 9, 2020 (status Pending), which is a continuation of U.S. application Ser. No. 16/082,137, having a 371c date of Sep. 4, 2018 (now U.S. Pat. No. 10,832,689 issued on Nov. 10, 2020), which is a 35 U.S.C. § 371 National Stage of International Patent Application No. PCT/EP2017/055430, filed Mar. 8, 2017, designating the United States and claiming priority to U.S. provisional application No. 62/305,683, filed on Mar. 9, 2016. The above identified applications and patent are incorporated by reference.

TECHNICAL FIELD

The present application relates to parametric coding of spatial audio or stereo signals.

BACKGROUND

Spatial or 3D audio is a generic formulation which denotes various kinds of multi-channel audio signals. Depending on the capturing and rendering methods, the audio scene is represented by a spatial audio format. Typical spatial audio formats defined by the capturing method (microphones) are for example denoted as stereo, binaural, ambisonics, etc. Spatial audio rendering systems (headphones or loudspeakers) are able to render spatial audio scenes with stereo (left and right channels 2.0) or more advanced multichannel audio signals (2.1, 5.1, 7.1, etc.).

Recent technologies for the transmission and manipulation of such audio signals allow the end user to have an enhanced audio experience with higher spatial quality often resulting in a better intelligibility as well as an augmented reality. Spatial audio coding techniques, such as MPEG Surround or MPEG-H 3D Audio, generate a compact representation of spatial audio signals which is compatible with data rate constraint applications such as streaming over the internet. The transmission of spatial audio signals is however limited when the data rate constraint is strong and therefore post-processing of the decoded audio channels is also used to enhanced the spatial audio playback. Commonly used techniques are for example able to blindly up-mix decoded mono or stereo signals into multi-channel audio (5.1 channels or more).

In order to efficiently render spatial audio scenes, the spatial audio coding and processing technologies make use of the spatial characteristics of the multi-channel audio signal. In particular, the time and level differences between the channels of the spatial audio capture are used to approximate the inter-aural cues which characterize our perception of directional sounds in space. Since the inter-channel time and level differences are only an approximation of what the auditory system is able to detect (i.e. the inter-aural time and level differences at the ear entrances), it is of high importance that the inter-channel time difference is relevant from a perceptual aspect. The inter-channel time and level differences are commonly used to model the directional components of multi-channel audio signals, while the inter-channel cross-correlation—that models the inter-aural cross-correlation (IACC)—is used to characterize the width of the audio image. Especially for lower frequencies the stereo image may as well be modeled with inter-channel phase differences (ICPD).

It should be noted that the binaural cues relevant for spatial auditory perception are called inter-aural level difference (ILD), inter-aural time difference (ITD) and inter-aural coherence or correlation (IC or IACC). When considering general multichannel signals, the corresponding cues related to the channels are inter-channel level difference (ICLD), inter-channel time difference (ICTD) and inter-channel coherence or correlation (ICC). In the following description the terms “inter-channel cross-correlation”, “inter-channel correlation” and “inter-channel coherence” are used interchangeably. Since the spatial audio processing mostly operates on the captured audio channels, the “C” is sometimes left out and the terms ITD, ILD and IC are often used also when referring to audio channels. FIG. 1 gives an illustration of these parameters. In FIG. 1, a spatial audio playback with a 5.1 surround system (5 discrete+1 low frequency effect) is shown. Inter-Channel parameters such as ICTD, ICLD and ICC are extracted from the audio channels in order to approximate the ITD, ILD and IACC, which models human perception of sound in space.

In FIG. 2, a typical setup employing the parametric spatial audio analysis is shown. FIG. 2 illustrates a basic block diagram of a parametric stereo coder 200. A stereo signal pair is input to the stereo encoder 201. The parameter extraction 202 aids the down-mix process, where a down-mixer 204 prepares a single channel representation of the two input channels to be encoded with a mono encoder 206. That is, the stereo channels are down-mixed into a mono signal 207 that is encoded and transmitted to the decoder 203 together with encoded parameters 205 describing the spatial image. Usually some of the stereo parameters are represented in spectral sub-bands on a perceptual frequency scale such as the equivalent rectangular bandwidth (ERB) scale. The decoder performs stereo synthesis based on the decoded mono signal and the transmitted parameters. That is, the decoder reconstructs the single channel using a mono decoder 210 and synthesizes the stereo channels using the parametric representation. The decoded mono signal and received encoded parameters are input to a parametric synthesis unit 212 or process that decodes the parameters, synthesizes the stereo channels using the decoded parameters, and outputs a synthesized stereo signal pair.

Since the encoded parameters are used to render spatial audio for the human auditory system, it is important that the inter-channel parameters are extracted and encoded with perceptual considerations for maximized perceived quality.

SUMMARY

Stereo and multi-channel audio signals are complex signals difficult to model especially when the environment is noisy or reverberant or when various audio components of the mixtures overlap in time and frequency i.e. noisy speech, speech over music or simultaneous talkers, etc.

When the ICTD parameter estimation becomes unreliable, the parametric representation of the audio scene becomes unstable and gives poor spatial rendering quality. Also, since the ICTD compensation is often carried out as a part of the down-mix stage, an unstable estimate will give a challenging and complex down-mix signal to be encoded.

The object of the embodiments is to increase the stability of the ICTD parameter, thereby improving both the down-mix signal that is encoded by the mono codec and the perceived stability in the spatial audio rendering in the decoder.

According to an aspect, it is provided a method for increasing stability of an inter-channel time difference (ICTD) parameter in parametric audio coding, wherein a multi-channel audio input signal comprising at least two channels is received. The method comprises obtaining an ICTD estimate, $ICTD_{est}(m)$, for an audio frame m and a stability estimate of said ICTD estimate, and determining whether the obtained ICTD estimate, $ICTD_{est}(m)$, is valid. If the $ICTD_{est}(m)$ is not found valid, and a determined sufficient number of valid ICTD estimates have been found in preceding frames, a hang-over time is determined using the stability estimate. A previously obtained valid ICTD parameter, ICTD(m−1), is selected as an output parameter, ICTD (m), during the hang-over time. The output parameter, ICTD (m), is set to zero if valid $ICTD_{est}(m)$ is not found during the hang-over time.

According to another aspect, an apparatus is provided for parametric audio coding. The apparatus is configured to receive a multi-channel audio input signal comprising at least two channels, and to obtain an ICTD estimate, $ICTD_{est}(m)$, for an audio frame m. The apparatus is configured to determine whether the obtained ICTD estimate, $ICTD_{est}(m)$, is valid and to obtain a stability estimate of said ICTD estimate. The apparatus is further configured to determine a hang-over time using the stability estimate if the $ICTD_{est}(m)$ is not found valid and a determined sufficient number of valid ICTD estimates have been found in preceding frames, and to select a previously obtained valid ICTD parameter, ICTD(m−1), as an output parameter, ICTD (m), during the hang-over time, and to set the output parameter, ICTD(m), to zero if valid $ICTD_{est}(m)$ is not found during the hang-over time.

According to another aspect, a computer program is provided. The computer program comprises instructions which, when executed on at least one processor, cause the at least one processor to obtain an ICTD estimate, $ICTD_{est}(m)$, for an audio frame m and a stability estimate of said ICTD estimate, and to determine whether the obtained ICTD estimate, $ICTD_{est}(m)$, is valid. If the $ICTD_{est}(m)$ is not found valid, and a determined sufficient number of valid ICTD estimates have been found in preceding frames, to determine a hang-over time using the stability estimate, and to select a previously obtained valid ICTD parameter, ICTD(m−1), as an output parameter, ICTD (m), during the hang-over time, and to set the output parameter, ICTD(m), to zero if valid $ICTD_{est}(m)$ is not found during the hang-over time.

According to another aspect, a method comprises obtaining a long term estimate of the stability of the ICTD parameter by averaging an ICC measure, and when reliable ICTD estimates cannot be obtained, using this stability estimate to determine a hysteresis period, or hang-over time, when a previously obtained reliable ICTD estimate is used. If reliable ICTD estimates are not obtained within the hysteresis period, the ICTD is set to zero.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
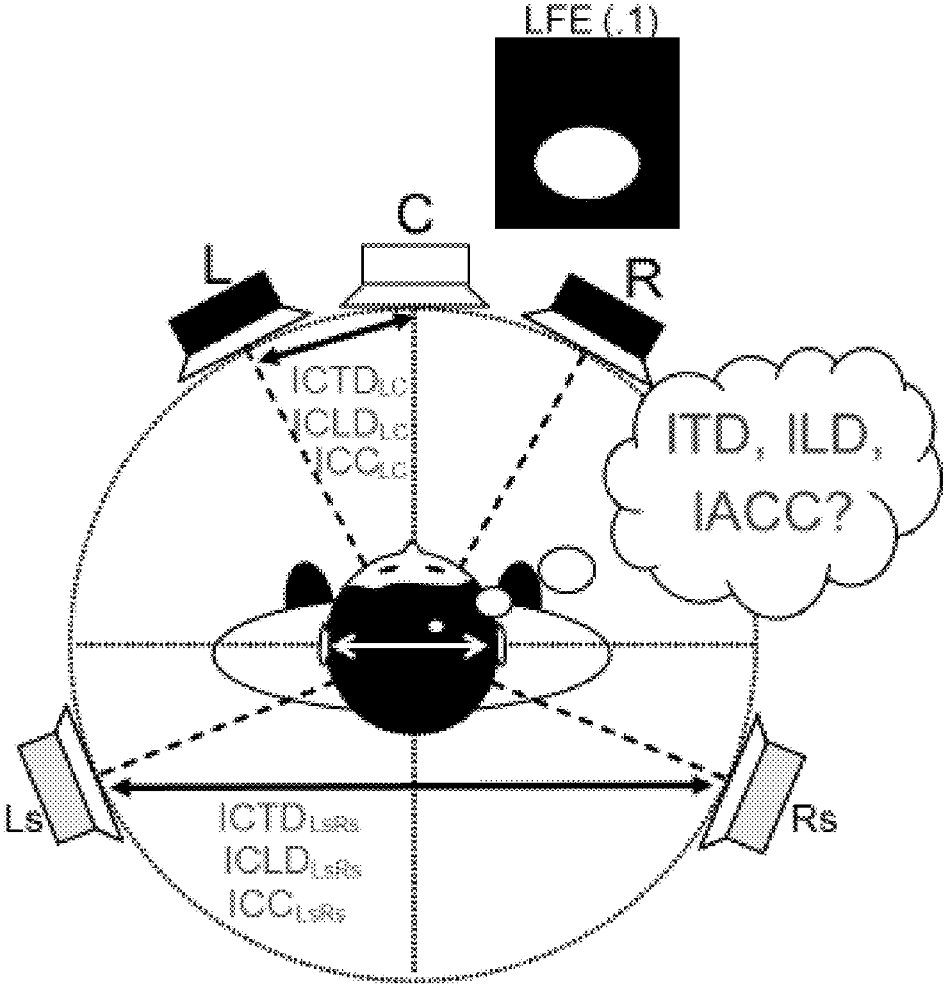
FIG. 1 illustrates spatial audio playback with a 5.1 surround system.

An example embodiment of the present invention and its potential advantages are understood by referring to FIGS. 1 through 10 of the drawings.

The conventional parametric approach of estimating the ICTD relies on the cross-correlation function (CCF) $r_{xy}$ which is a measure of similarity between two waveforms x[n] and y[n], and is generally defined in the time domain as:

$$r_{xy}[n,\tau]=E[x[n]y[n+\tau]], \quad (1)$$

where τ is the time-lag parameter and E[•] the expectation operator. For a signal frame of length N the cross-correlation is typically estimated as:

$$r_{xy}[\tau]=\sum_{n=0}^{N-1}x[n]y[n+\tau]. \quad (2)$$

The ICC is conventionally obtained as the maximum of the CCF which is normalized by the signal energies as follows:

$$ICC=\max_{\tau=ITD}\left(\frac{r_{xy}[\tau]}{\sqrt{r_{xx}[0]r_{yy}[0]}}\right). \quad (3)$$

The time lag τ corresponding to the ICC is determined as the ICTD between the channels x and y. By assuming x[n] and y[n] are zero outside the signal frame, the cross-correlation function can equivalently be expressed as a function of the cross-spectrum of the frequency spectra X[k] and Y[k] (with discrete frequency index k) as:

$$r_{xy}[\tau]=DFT^{-1}(X[k]Y^*[k]) \quad (4)$$

where X[k] is the discrete Fourier transform (DFT) of the time domain signal x[n], i.e.

$$X[k]=\sum_{n=0}^{N-1}x[n]e^{-i\frac{2\pi}{N}kn},\ k=0,\ \dots\ ,N-1 \quad (5)$$

and the $DFT^{-1}(\bullet)$ or IDFT(•) denotes the inverse discrete Fourier transform. Y*[k] is the complex conjugate of the DFT of y(n).

For the case when y[n] is purely a delayed version of x[n], the cross-correlation function is given by:

$$r_{xy}[\tau] = DFT^{-1}\left(X[k]X^*[k]e^{-i\frac{2\pi}{N}k\tau_0}\right) = r_{xx}[\tau] * \delta(\tau - \tau_0), \tag{6}$$

where * denotes convolution and $\delta(\tau-\tau_0)$ is the Kronecker delta function, i.e. it is equal to one at $\tau_0$ and zero otherwise. This means that the cross-correlation function between x and y is the delta function spread by the convolution with the autocorrelation function for x[n]. For signal frames with several delay components, e.g. several talkers, there will be peaks at each delay present between the signals, and the cross-correlation becomes:

$$r_{xy}[\tau]=r_{xx}[\tau]*\Sigma_i\delta(\tau-\tau_i). \tag{7}$$

The delta functions might then be spread into each other and make it difficult to identify the several delays within the signal frame. There are however generalized cross-correlation (GCC) functions that do not have this spreading. The GCC is generally defined as:

$$r_{xy}^{GCC}[\tau]=\mathrm{DFT}^{-1}(\psi[k]X[k]Y^*[k]) \tag{8}$$

where $\psi$[k] is a frequency weighting. Especially for spatial audio, the phase transform (PHAT) has been utilized due to its robustness for reverberation in low noise environments. The phase transform is basically the absolute value of each frequency coefficient, i.e.

$$\psi[k] = \frac{1}{|X[k]Y^*[k]|}. \tag{9}$$

This weighting will thereby whiten the cross-spectrum such that the power of each component becomes equal. With pure delay and uncorrelated noise in the signals x[n] and y[n] the phase transformed GCC (GCC-PHAT) becomes just the Kronecker delta function $\delta(\tau-\tau_0)$, i.e.:

$$r_{xy}^{PHAT}[\tau] = DFT^{-1}\left(\frac{X[k]X^*[k]e^{-i\frac{2\pi}{N}k\tau_0}}{|X[k]X^*[k]|}\right) = DFT^{-1}\left(e^{-i\frac{2\pi}{N}k\tau_0}\right) = \delta(\tau - \tau_0) \tag{10}$$

Figure 3:
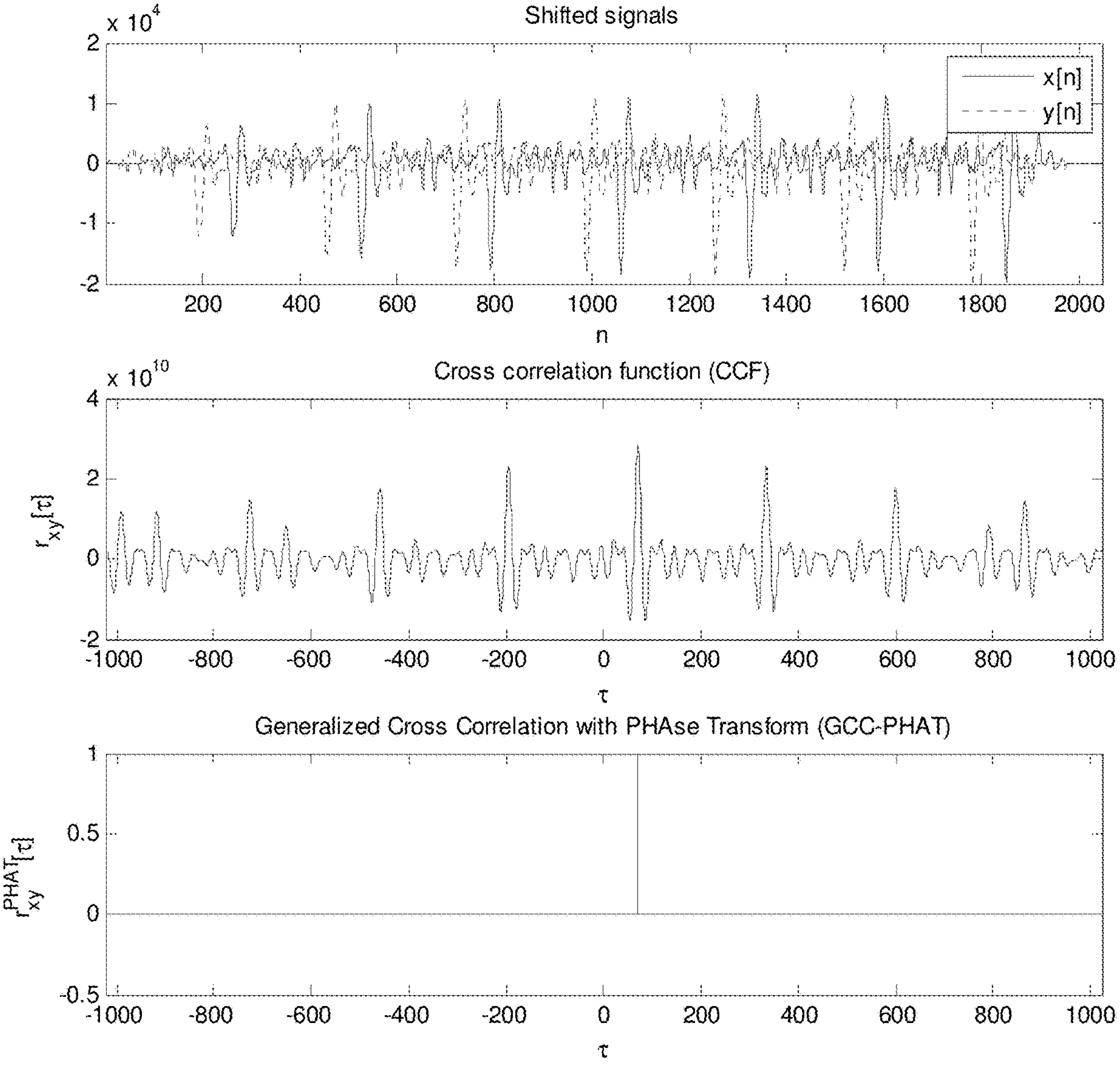
FIG. 3 illustrates the pure delay situation.

FIG. 3 illustrates the pure delay situation. In the top plot an illustration of cross-correlation between two signals that differ only by a pure delay is shown. The middle plot shows the cross-correlation function (CCF) of the two signals. It corresponds to the autocorrelation of the source displaced by a convolution with a delta function $\delta(\tau-\tau_0)$. The bottom plot shows the GCC-PHAT of the input signals, yielding a delta function for the pure delay situation.

The present method is based on an adaptive hang-over time, also called a hang-over period, that depends on the long-term estimate of the ICC. In an embodiment of the method a long term estimate of the stability of the ICTD parameter is obtained by averaging an ICC measure. When reliable estimates cannot be obtained, the stability estimate is used to determine a hysteresis period, or hang-over time, when a previously obtained reliable estimate is used. If reliable estimates are not obtained within the hysteresis period, the ICTD is set to zero.

Considering a system designated to obtain spatial representation parameters for an audio input consisting of two or more audio channels. Each channel is segmented into time frames m. For a multichannel approach, the spatial parameters are typically obtained for channel pairs, and for a stereo setup this pair is simply the left and right channel. Hereafter it is focused on the spatial parameters for a single channel pair x[n, m] and y[n, m], where n denotes sample number and m denotes frame number.

A cross-correlation measure and an ICTD estimate is obtained for each frame m. After the ICC(m) and $ICTD_{est}$(m) for the current frame have been obtained, a decision is made whether $ICTD_{est}$(m) is valid, i.e. relevant/useful/reliable, or not.

If the ICTD is found valid, the ICC is filtered to obtain an estimate of the peak envelope of the ICC. The output ICTD parameter ICTD(m) is set to the valid estimate $ICTD_{est}$(m). In the following, the terms "ICTD measure", "ICTD parameter" and "ICTD value" are used interchangeably for ICTD (m). Further, the hang-over counter $N_{HO}$ is set to zero to indicate no hang-over state.

If the ICTD is not found valid, it is determined whether a sufficient number of valid ICTD measurements have been found in the preceding frames, i.e. whether ICTD_count=ICTD_maxcount. If a sufficient number of valid ICTD measurements have been found in the preceding frames, a hysteresis period, or hang-over time, is calculated. If $ICTD_{count}$<$ICTD_{maxcount}$, insufficient number of consecutive ICTD estimates have been registered in the past frames or the current state is a hang-over state. Then it is determined whether a current state is a hang-over state. If the current state is not a hang-over state, then ICTD(m) is set to 0. If the current state is a hang-over state then the previous ICTD value will be selected, i.e. ICTD(m)=ICTD(m−1).

Figure 4A:
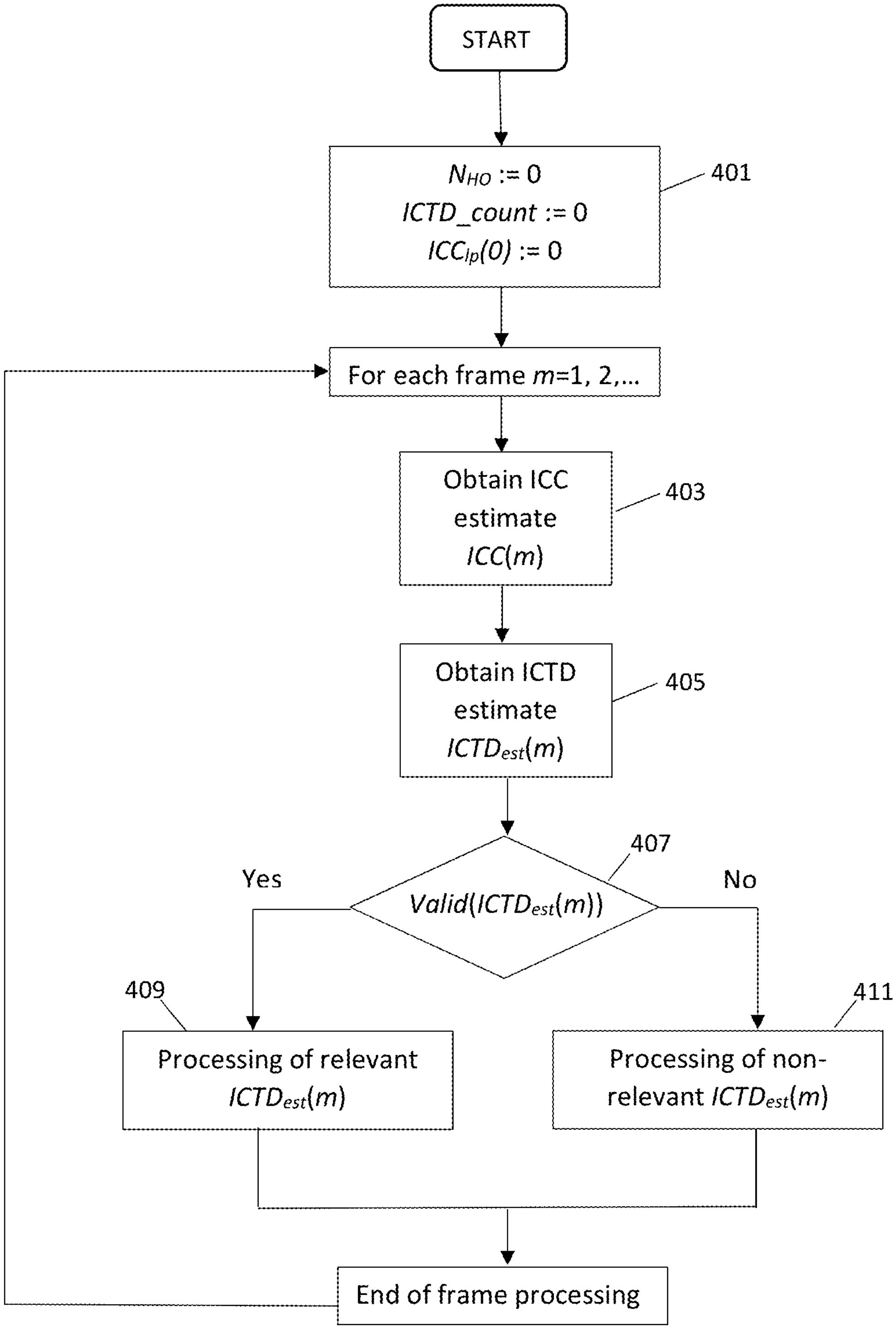
FIG. 4*a* is a flow chart illustration of the ICTD/ICC processing according to an embodiment.

The general steps of the ICTD/ICC processing are illustrated in FIG. 4*a*. Internal states/memories may be maintained to facilitate this method. First, in block 401, a long term estimate of the ICC, $ICC_{LP}$(m), is initialized to 0. The counter $N_{HO}$ keeps track of the number of hang-over frames to be used and the counter ICTD_count is used for maintaining the number of consecutively observed valid ICTD values. Both counters may be initialized to 0. It should be noted that the realization with discrete frame counters is just an example for implementing an adaptive hysteresis. For instance, a real-valued counter, a floating point counter or a fractional time counter may also be used, and the adaptive increment/decrement may also assume fractional values.

As illustrated in FIG. 4*a*, the processing steps are repeated for each frame m. Given the input waveform signals x[n, m] and y[n, m] of frame m, a cross-correlation measure is obtained in block 403. In this embodiment the Generalized Cross Correlation with Phase Transform (GCC PHAT) $r_{xy}^{PHAT}[\tau,m]$ is used.

$$ICC(m) = \max_\tau\left(r_{xy}^{PHAT}[\tau, m]\right) \tag{11}$$

Other measures such as the peak of the normalized cross-correlation function may also be used, i.e.

$$ICC(m) = \max_\tau\left(\frac{r_{xy}[\tau, m]}{\sqrt{r_{xx}[0, m]r_{yy}[0, m]}}\right) \tag{12}$$

Further, in block 405, an ICTD estimate, $ICTD_{est}$(m), is obtained. Preferably, the estimates for ICC and ICTD will be obtained using the same cross-correlation method to consume the least amount of computational power. The T that maximizes the cross-correlation may be selected as the ICTD estimate. Here, the GCC PHAT is used.

$$ICTD_{est}(m) = \underset{\tau}{\operatorname{argmax}}\left(r_{xy}^{PHAT}[\tau]\right) \quad (13)$$

Typically the search range for T would be limited to the range of ICTDs that needs to be represented, but it is also limited by the length of the audio frame and/or the length of the DFT used for the correlation computation (see N in equation (5)). This means that the audio frame length and DFT analysis windows need to be long enough to accommodate the longest time difference $\tau_{max}$ that needs to be represented, which means that $N>2\tau_{max}$. As an example, for the ability to represent a distance between a pair of microphones of 1.5 meters, assuming speed of sound is 340 m/s and using a sample rate of 32000 samples/second, the search range would be $[-\tau_{max},\tau_{max}]$ where:

$$\tau_{max} = \frac{1.5\ \text{m} \times 32000\ \text{samples/s}}{340\ \text{m/s}} \approx 141\ \text{samples} \quad (14)$$

After the ICC(m) and $ICTD_{est}(m)$ for the current frame have been obtained, a decision in block 407 is made whether $ICTD_{est}(m)$ is valid or not. This may be done by comparing the relative peak magnitude of a cross-correlation function to a threshold $ICC_{thres}(m)$ based on the cross-correlation function, e.g. $r_{xy}^{PHAT}[\tau,m]$ or $r_{xy}[\tau,m]$, such that $ICC(m)>ICC_{thres}(m)$ means the ICTD is valid.

$$\text{Valid}(ICDT_{est}(m))=ICC(m)>ICC_{thres}(m) \quad (15)$$

Such a threshold can for instance be formed by a constant $C_{thres}$ multiplied by the standard deviation estimate of the cross-correlation function, where a suitable value may be $C_{thres}=5$.

$$ICC_{thres}(m) = C_{thres}\sqrt{\frac{1}{2\tau_{max}}\sum_{\tau=-\tau_{max}}^{\tau_{max}}\left(r_{xy}^{PHAT}[\tau]-\bar{r}\right)^2} \quad (16)$$

$$\bar{r} = \frac{1}{2\tau_{max}+1}\sum_{\tau=-\tau_{max}}^{\tau_{max}} r_{xy}^{PHAT}[\tau] \quad (17)$$

Another method is to sort the search range and use the value at e.g. the 95 percentile multiplied with a constant.

$$ICC_{thres}(m) = C_{thres2}\, r_{xy,sorted}^{PHAT}[\tau_{95}] \quad (18)$$

$$\begin{cases} r_{xy,sorted}^{PHAT}[\tau] = \text{sort}\left(r_{xy}^{PHAT}[\tau]\right) \\ \tau_{95} = \lfloor (2\tau+1)\cdot 0.95 + 0.5 \rfloor \\ C_{thres2} = 3 \end{cases} \quad (19)$$

where sort( ) is a function that sorts the input vector in ascending order.

Figure 4B:
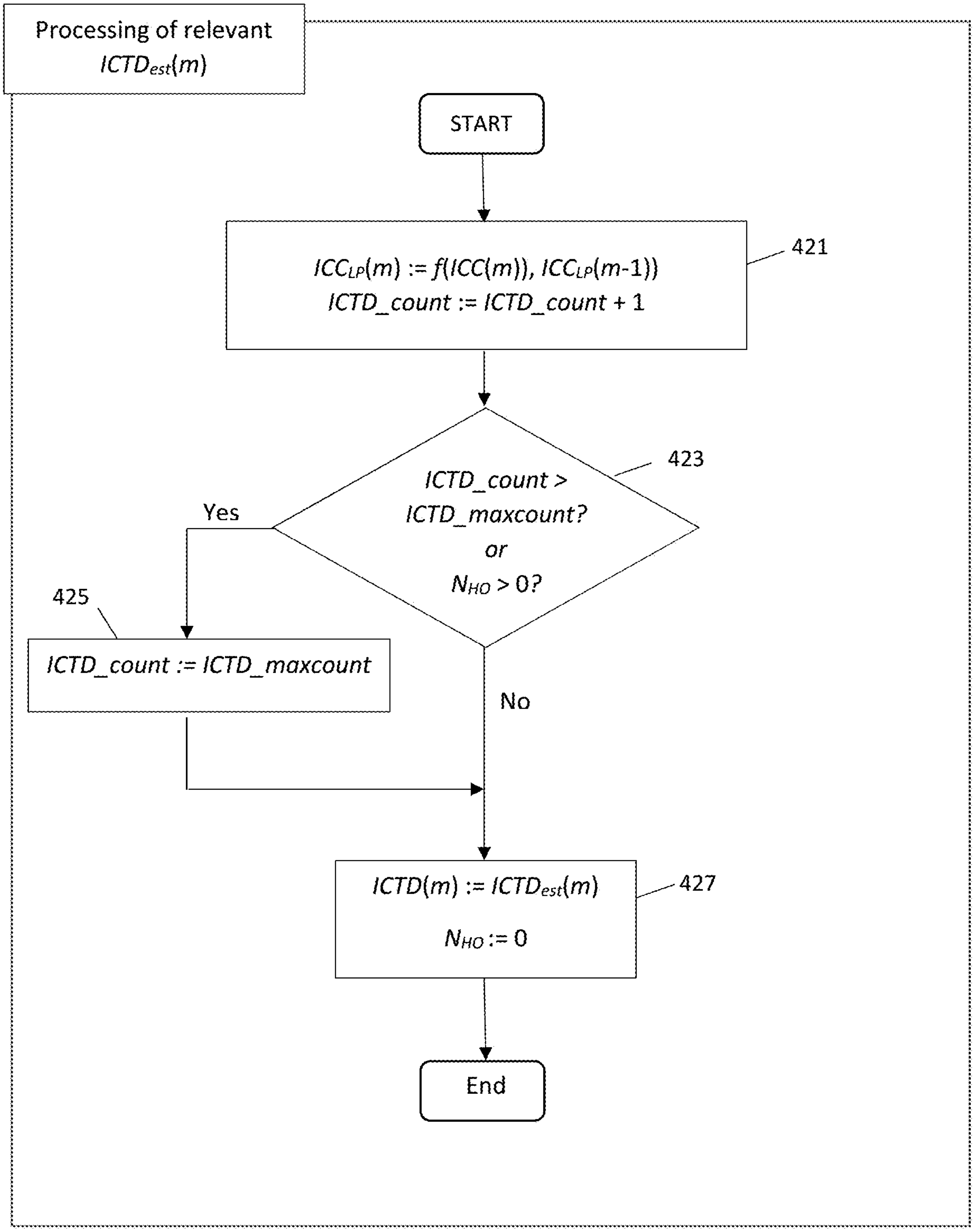
FIG. 4*b* is a flow chart illustration of the ICTD/ICC processing in the branch of relevant $ICTD_{est}(m)$ according to an embodiment.

If the ICTD is found valid, the steps of block 409, outlined in FIG. 4*b*, are carried out. First, in block 421, the ICC is filtered to obtain an estimate of the peak envelope of the ICC. This may be done using a first order IIR filter where the filter coefficient (forgetting/update factor) is dependent on the current ICC value relative to the last filtered ICC value.

$$ICC_{LP}(m) = f(ICC(m), ICC_{LP}(m-1)) \quad (20)$$

$$f(ICC(m), ICC_{LP}(m-1)) = \begin{cases} \alpha_1 ICC(m) + (1-\alpha_1)ICC_{LP}(m-1), & ICC(m) > ICC_{LP}(m-1) \\ \alpha_2 ICC(m) + (1-\alpha_2)ICC_{LP}(m-1), & ICC(m) \le ICC_{LP}(m-1) \end{cases} \quad (21)$$

If $\alpha_1 \in [0,1]$ is set relatively high (e.g. $\alpha_1=0.9$) and $\alpha_2 \in [0,1]$ is set relatively low (e.g. $\alpha_2=0.1$), the filtering operation will tend to follow the peak values of the ICC, forming an envelope of the signal. The motivation is to have an estimate of the last highest ICCs when coming to a situation where the ICC has dropped to a low level (and not just indicate the last few values in the transition to a low ICC). The counter ICTD_count is incremented to keep track of the number of consecutive valid ICTDs. Then, in block 425, the ICTD_count is set to ICTD_maxcount if it is determined in block 423 that the ICTD_maxcount is exceeded or if the system is currently in an ICTD hang-over state and $N_{HO}>0$. The former criterion is there to prevent the counter for wrapping around in a limited precision integer number. The latter criterion would capture the event that a valid ICTD is found during a hang-over period. Setting the ICTD_count to ICTD_maxcount will trigger a new hang-over period, which may be desirable in this case. Finally, in block 427, the output ICTD measure ICTD(m) is set to the valid estimate $ICTD_{est}(m)$. The hang-over counter $N_{HO}$ is also set to zero to indicate that a current state is not a hang-over state.

Figure 4C:
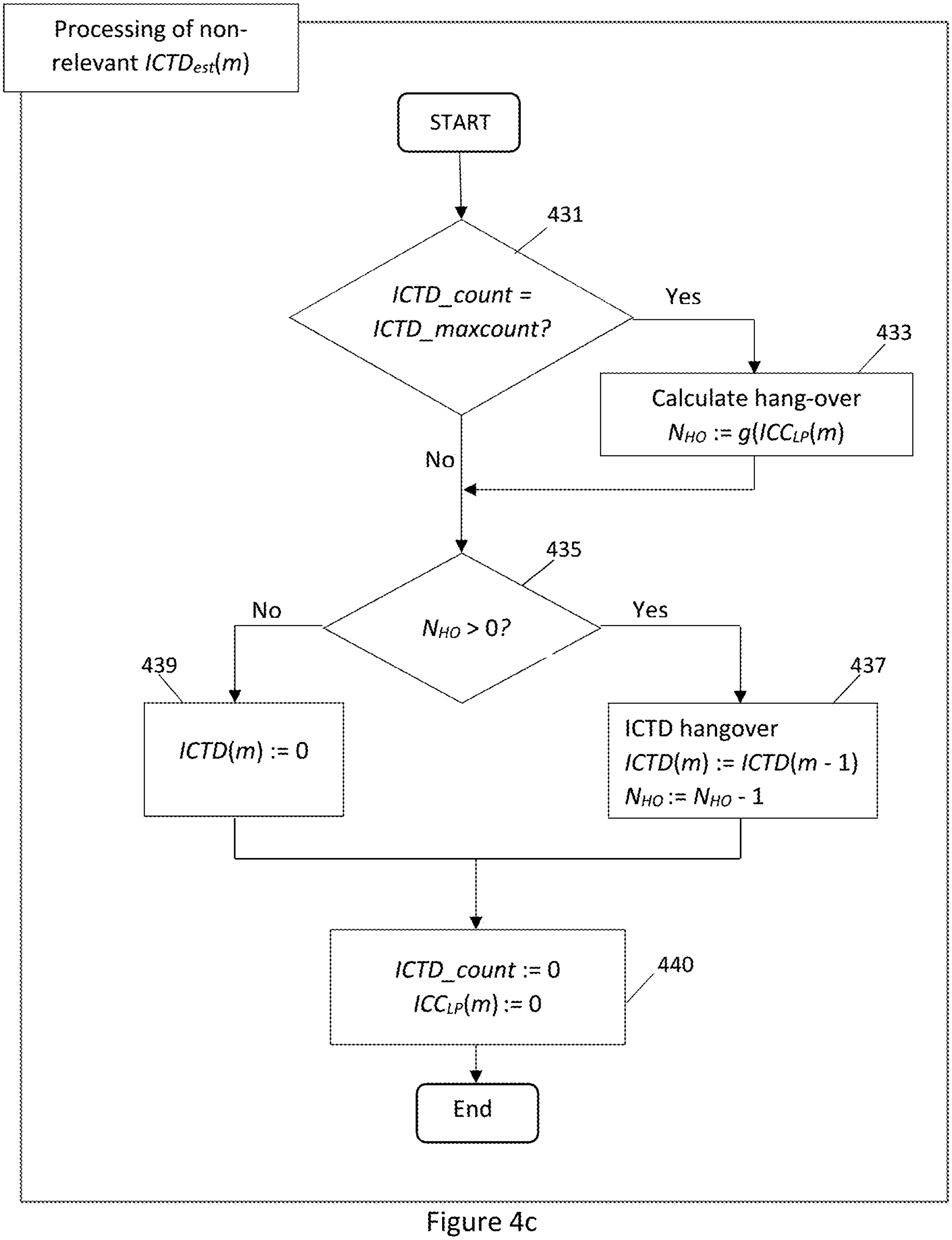
FIG. 4*c* is a flow chart illustration of the ICTD/ICC processing in the branch of non-relevant $ICTD_{est}(m)$ according to an embodiment.

If the ICTD is not found valid, the steps of block 411, outlined in FIG. 4*c*, will be performed. If a sufficient number of valid ICTD measurements have been found in the preceding frames, which is determined in block 431, a hysteresis period, or hang-over time, is calculated in block 433. In this exemplary embodiment, the sufficient number of valid ICTD measurements is reached when ICTD_count=ICTD_maxcount. Here, ICTD_maxcount=2, which means two consecutive valid ICTD measurements is enough to trigger the hang-over logic. A higher ICTD_maxcount such as 3, 4 or 5 would also be possible. This would further restrict the hang-over logic to be used only when longer sequences of valid ICTD measurements have been obtained.

Figure 5:
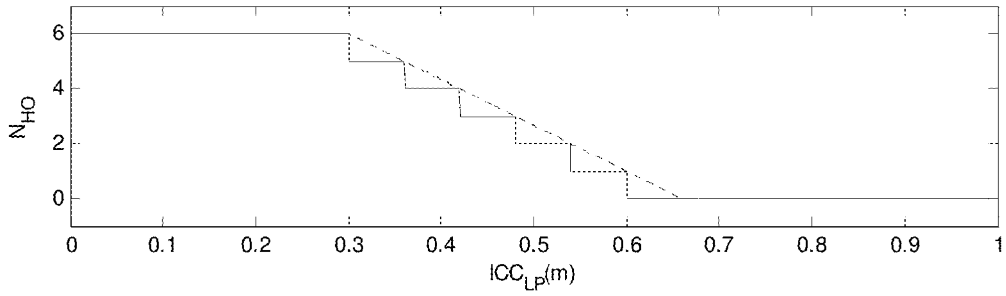
FIG. 5 shows a mapping function for determining a number of hang-over frames according to an embodiment.

The hang-over time $N_{HO}$ is adaptive and depends on the ICC such that if the recent ICC estimates have been low (corresponding to low $ICC_{LP}(m)$), the hang-over time should be long, and vice versa. That is, $ICC_{LP}(m):=ICC_{LP}(m-1)$ and $$N_{HO}=g(ICC_{LP}(m)) \quad (22)$$

$$g(ICC_{LP}(m))=\max(0,\min(N_{HOmax},\lfloor c+d\cdot ICC_{LP}(m)\rfloor)) \quad (23)$$

where the constants $N_{HOmax}$, c and d may be set to e.g.

$$\begin{cases} N_{HOmax} = 6 \\ c = -da + 1 \\ d = -\dfrac{(N_{HOmax}-1)}{a-b} \\ a = 0.6 \\ b = 0.3 \end{cases} \quad (24)$$

and $\lfloor\cdot\rfloor$ denotes the floor function which truncates/rounds down to the nearest integer. The max( ) and min( ) functions both take two arguments and return the largest and smallest argument, respectively. An illustration of this function can be seen in FIG. 5. FIG. 5 illustrates a mapping function $N_{HO}=g(ICC_{LP}(m))$ that determines a number of hang-over frames $N_{HO}$ given the low-pass filtered inter-channel correlation $ICC_{LP}(m)$, which is sampled for a frame when no reliable ICTD can be extracted. As illustrated in FIG. 5, this is a linear declining function which assigns $N_{HOmax}=6$ hang-over frames for $ICC_{LP}(m)<b$ and 0 hang-over frames for $ICC_{LP}(m)>a$. For $b<ICC_{LP}(m)<a$, hang-over is applied with increasing number of frames for decreasing $ICC_{LP}(m)$. The dotted line represents the function without the floor/round down operation. A suitable value for a was found to be a=0.6, but the range [0.5,1) could for instance be considered. Correspondingly for b, a suitable value was found to be b=0.3, but the range (0, a) could be considered.

In general, any parameter indicating the correlation, i.e. coherence or similarity, between the channels may be used as a control parameter ICC(m), but the mapping function described in equation (22) has to be adapted to give suitable number of hang-over frames for the low/high correlation cases. Experimentally, a low correlation situation should give around 3-8 frames of hang-over, while a high correlation case should give 0 frames of hang-over.

If $ICTD_{count}<ICTD_{maxcount}$, this means either that insufficient number of consecutive ICTD estimates have been registered in the past frames, or that the current state is a hang-over state. In block 435 it is determined whether $N_{HO}>0$. If $N_{HO}=0$, then ICTD(m) is set to 0 in block 439. If, on the other hand, $N_{HO}>0$, the current state is a hang-over state and the previous ICTD value will be selected, i.e. ICTD(m)=ICTD(m−1), in block 437. In this case the hang-over counter is also decremented, $N_{HO}:=N_{HO}-1$. (The assignment operator ':=' is used to indicate that the old value of $N_{HO}$ is overwritten with the new one.) Finally, in block 440, ICTD_count and $ICC_{LP}(m)$ are set to zero.

Figure 6:
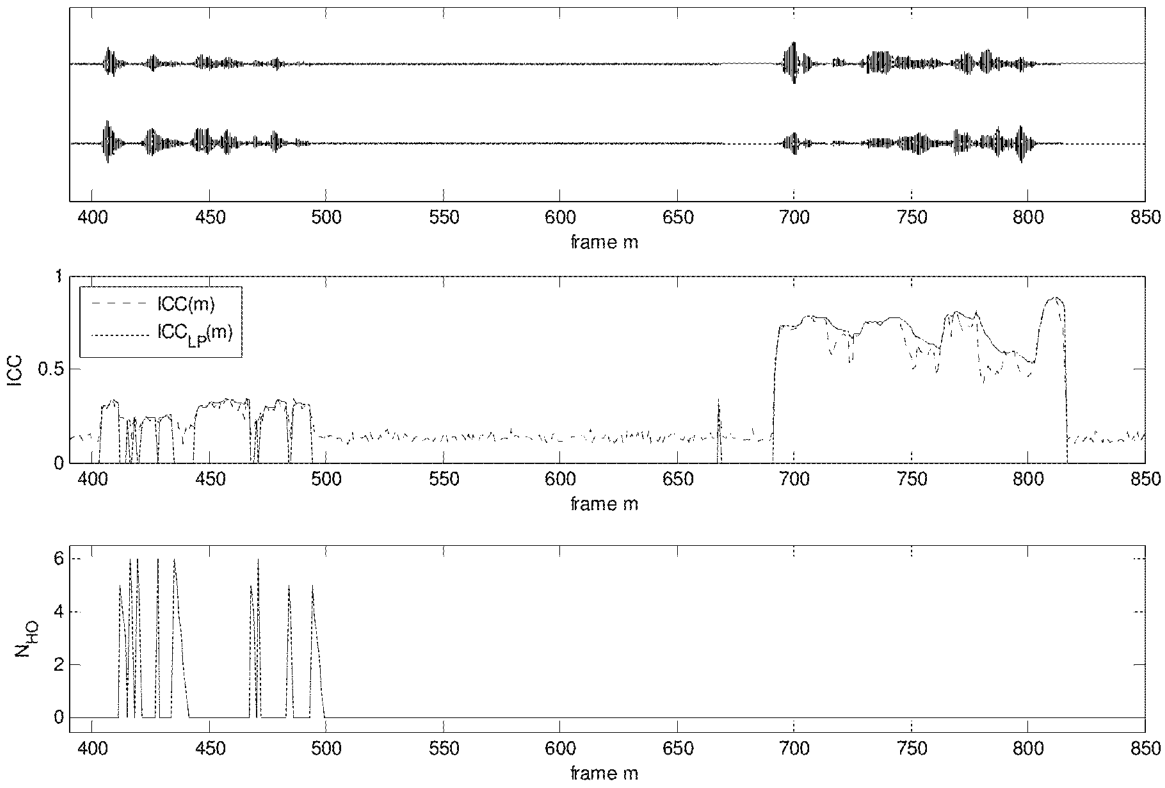
FIG. 6 illustrates an example of how the ITD hang-over logic is applied according to an embodiment.

FIG. 6 illustrates how the ITD hang-over logic is applied on a noisy speech segment followed by a clean speech segment. The noisy speech segment triggers ITD hang-over frames when the ICTD estimates are no longer valid. In the clean speech segment no hang-over frames are added. The top plot shows the audio input channels, in this case left and right of a stereo recording. The second plot shows the ICC(m) and $ICC_{LP}(m)$ of the example file, and the bottom plot shows the ITD hang-over counter $N_{HO}$. It can be seen that for low correlation during the noisy speech segment in the beginning of the file triggers ITD hang-over frames, while the clean speech segment does not trigger any hang-over frames.

Figure 7:
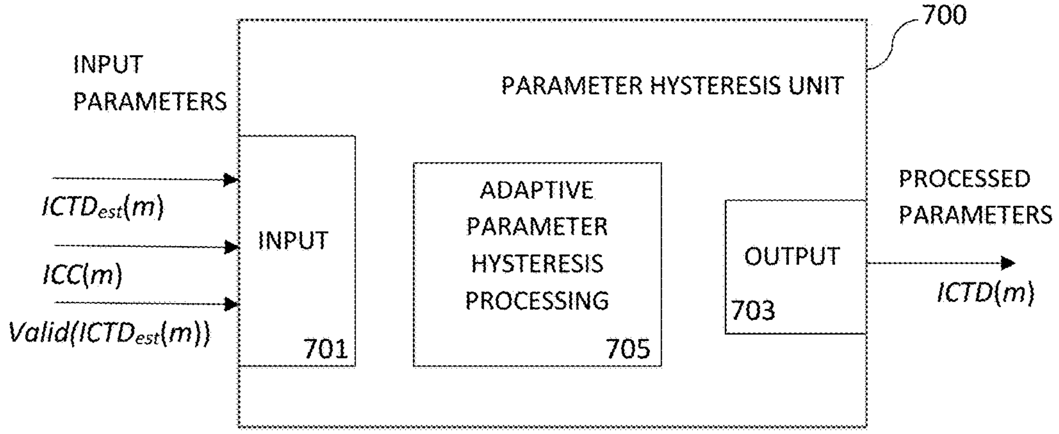
FIG. 7 illustrates an example of a parameter hysteresis unit.

The method described here may be implemented in a microprocessor or on a computer. It may also be implemented in hardware in a parameter hysteresis/hang-over logic unit as shown in FIG. 7. FIG. 7 shows a parameter hysteresis unit 700 that takes the $ICTD_{est}(m)$, ICC(m) and Valid($ICTD_{est}(m)$) as input parameters. After processing the input parameters by an adaptive parameter hysteresis unit 705 according to the described method, the final parameter is a decision whether the $ICTD_{est}(m)$ is valid or not. The output parameter is the selected ICTD(m). An input 701 of the parameter hysteresis unit may be communicatively coupled to the parameter extraction unit 202 shown in FIG. 2, and an output 703 of the parameter hysteresis unit may be communicatively coupled to the parameter encoder 208 shown in FIG. 2. Alternatively, the parameter hysteresis unit may be comprised in the parameter extraction unit 202 shown in FIG. 2.

Figure 8:
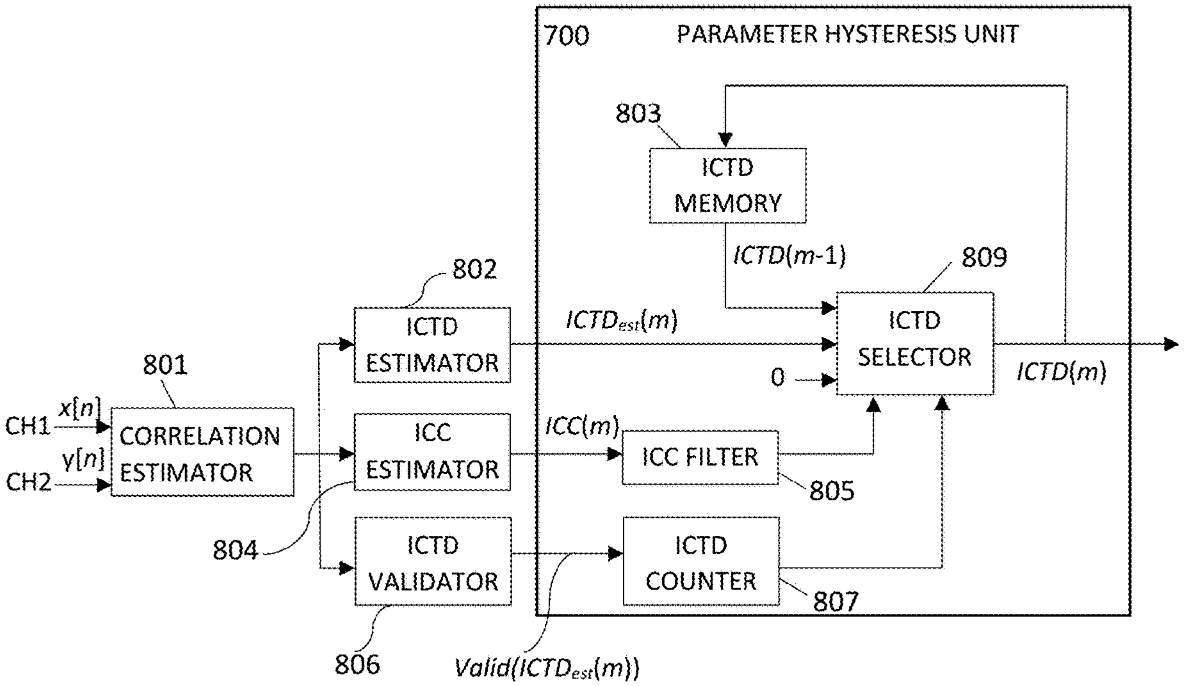
FIG. 8 is another example illustration of a parameter hysteresis unit.

FIG. 8 describes a parameter hysteresis unit, or a hang-over logic unit 700 in more detail. The input parameters $ICTD_{est}(m)$, ICC(m), and Valid($ICTD_{est}(m)$) are preferably generated, by an ICTD estimator 802, an ICC estimator 804 and an ICTD validator 806, respectively, from the same cross-correlation analysis $r_{xy}(\tau)$, e.g. $r_{xy}^{PHAT}(\tau)$ performed by a correlation estimator 801. However, there may be benefits of having the ICC measure decoupled from the ICTD estimation. Further, the described method does not imply a certain method of deciding if the ICTD parameter is valid (i.e. reliable), but can be implemented with any measure indicating a binary (Yes/No) decision on the validity of the parameter. Further in FIG. 8, the ICC estimate is filtered by an ICC filter 805 to form a long-term estimate of the ICC, preferably tuned to follow the peaks of the ICC. An ICTD counter 807 keeps track of the number of consecutive valid ICTD estimates ICTD_count, as well as the number of hang-over frames in a hang-over state $N_{HO}$. The ICTD memory 803 remembers the ICTD decision which was last output from the hysteresis unit. Finally, the ICTD selector 809 takes the inputs $ICC_{LP}(m)$, ICTD_count and $N_{HO}$ and selects either $ICTD_{est}(m)$, ICTD(m−1) or 0 as the ICTD parameter ICTD(m).

Figure 9:
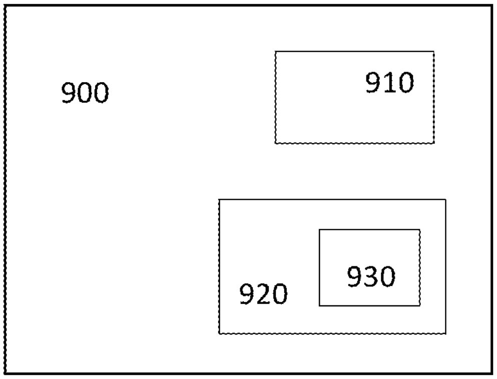
FIG. 9 illustrates an apparatus for implementing the methods described herein.

FIG. 9 shows an example of an apparatus performing the method illustrated in FIGS. 4*a*-4*c*. The apparatus 900 comprises a processor 910, e.g. a central processing unit (CPU), and a computer program product 920 in the form of a memory for storing the instructions, e.g. computer program 930 that, when retrieved from the memory and executed by the processor 910 causes the apparatus 900 to perform processes connected with embodiments of the present adaptive parameter hysteresis processing. The processor 910 is communicatively coupled to the memory 920. The apparatus may further comprise an input node for receiving input parameters, and an output node for outputting processed parameters. The input node and the output node are both communicatively coupled to the processor 910.

By way of example, the software or computer program 930 may be realized as a computer program product, which is normally carried or stored on a computer-readable medium, preferably non-volatile computer-readable storage medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device.

Figure 2:
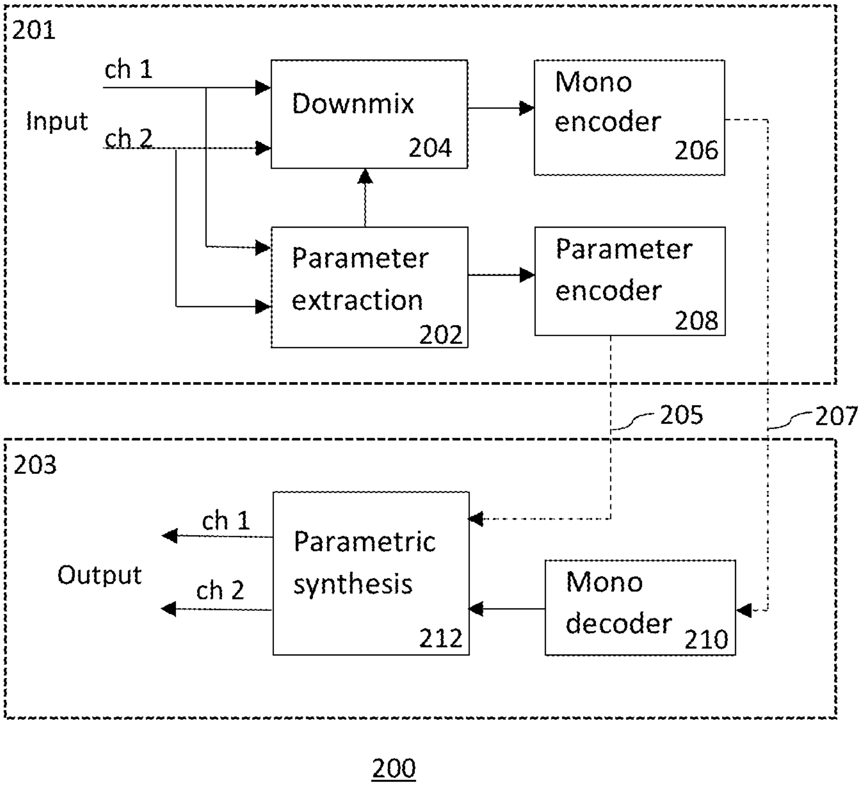
FIG. 2 illustrates a basic block diagram of a parametric stereo coder.
Figure 10:
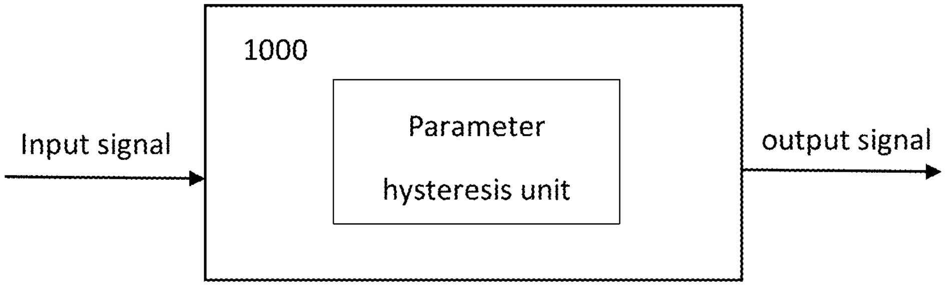
FIG. 10 illustrates a parameter hysteresis unit according to an embodiment.

FIG. 10 shows a device 1000 comprising a parameter hysteresis unit that is illustrated in FIGS. 7 and 8. The device may be an encoder, e.g., an audio encoder. An input signal is a stereo or multi-channel audio signal. The output signal is an encoded mono signal with encoded parameters describing the spatial image. The device may further comprise a transmitter (not shown) for transmitting the output signal to an audio decoder. The device may further comprise a downmixer and a parameter extraction unit/module, and a mono encoder and a parameter encoder as shown in FIG. 2.

In an embodiment, a device comprises obtaining units for obtaining a cross-correlation measure and an ICTD estimate, and a decision unit for deciding whether $ICTD_{est}(m)$ is valid or not. The device further comprises an obtaining unit for obtaining an estimate of the peak envelope of the ICC, and a determining units for determining whether a sufficient number of valid ICTD measurements have been found in the preceding frames and for determining whether a current state is a hang-over state. The device further comprises an output unit for outputting ICTD measure.

According to embodiments of the present invention, the method for increasing stability of an inter-channel time difference (ICTD) parameter in parametric audio coding comprises receiving a multi-channel audio input signal comprising at least two channels. Obtaining an ICTD estimate, $ICTD_{est}(m)$, for an audio frame m, determining whether the obtained ICTD estimate, $ICTD_{est}(m)$, is valid and obtaining a stability estimate of said ICTD estimate. If the $ICTD_{est}(m)$ is not found valid, and a determined sufficient number of valid ICTD estimates have been found in preceding frames, determining a hang-over time using the stability estimate, selecting a previously obtained valid ICTD parameter, ICTD(m−1), as an output parameter, ICTD (m), during the hang-over time; and setting the output parameter, ICTD(m), to zero if valid $ICTD_{est}(m)$ is not found during the hang-over time.

In an embodiment the stability estimate is an inter channel correlation (ICC) measure between a channel pair for an audio frame m.

In an embodiment the stability estimate is a low-pass filtered inter-channel correlation, $ICC_{LP}(m)$.

In an embodiment the stability estimate is calculated by averaging the ICC measure, ICC(m).

In an embodiment the hang-over time is adaptive. For instance, the hang-over is applied with increasing number of frames for decreasing $ICC_{LP}(m)$.

In an embodiment a Generalized Cross Correlation with Phase Transform is used for obtaining the ICC measure for the frame m.

In an embodiment $ICTD_{est}(m)$ is determined to be valid if the inter-channel correlation measure, ICC(m), is larger than a threshold $ICC_{thres}(m)$.

For instance, the validity of the obtained ICTD estimate, $ICTD_{est}(m)$, is determined by comparing a relative peak magnitude of a cross-correlation function to a threshold, $ICC_{thres}(m)$, based on the cross correlation function. $ICC_{thres}(m)$ may be formed by a constant multiplied by a value of the cross-correlation at a predetermined position in an ordered set of cross correlation values for frame m.

In an embodiment the sufficient number of valid ICTD estimates is 2.

Embodiments of the present invention may be implemented in software, hardware, application logic or a combination of software, hardware and application logic. The software, application logic and/or hardware may reside on a memory, a microprocessor or a central processing unit. If desired, part of the software, application logic and/or hardware may reside on a host device or on a memory, a microprocessor or a central processing unit of the host. In an example embodiment, the application logic, software or an instruction set is maintained on any one of various conventional computer-readable media.

Abbreviations

ICC Inter-channel correlation

IC Inter-aural coherence, also IACC for inter-aural cross-correlation

ICTD Inter-channel time difference

ITD Inter-aural time difference

ICLD Inter-channel level difference

ILD Inter-aural level difference

ICPD Inter-channel phase difference

IPD Inter-aural phase difference

The invention claimed is:

1. A method for determining an adaptive hysteresis for inter-channel time difference (ICTD) parameter, the method comprising:

obtaining an ICTD estimate between a channel pair of a multi-channel audio signal;

when a reliable ICTD estimate is obtained for a frame m, low-pass filtering an inter- channel correlation (ICC) measure to obtain a long term estimate of a stability ($ICC_{LP}$) of an ICTD parameter;

using said stability estimate ($ICC_{Lp}$) to determine a hysteresis period, during which a previously obtained reliable ICTD estimate is used, when reliable ICTD estimates are not obtained; and setting the ICTD to zero if reliable ICTD estimates are not obtained within the hysteresis period.

2. The method of claim 1, wherein the ICC is filtered using a first order IIR filter where a filter coefficient is dependent on the current ICC value relative to the last filtered ICC value.

3. The method of claim 1, wherein the hysteresis period is adaptive.

4. The method of claim 3, wherein the hysteresis period depends on the stability estimate ($ICC_{LP}$) such that when $b<ICC_{LP}<a$, where a and b are predetermined constants, an increasing number of frames is applied for decreasing $ICC_{LP}$.

5. The method of claim 1, wherein the hysteresis period $N_{HO}$ is determined as:

$$N_{HO}=\max(0,\min(N_{HOmax},\lfloor c+d\cdot ICC_{LP}(m)\rfloor)),$$

where $ICC_{LP}(m):=ICC_{LP}(m-1)$ is a low-pass filtered inter-channel correlation for frame m−1, and $N_{HOmax}$, c and d are predetermined constants.

6. A non-transitory computer readable storage medium storing a computer program comprising instructions which, when executed on at least one processor, cause the at least one processor to carry out the method of claim 1.

7. An apparatus for determining an adaptive hysteresis for inter-channel time difference (ICTD) parameter in parametric audio coding, the apparatus comprising:

means for obtaining an ICTD estimate between a channel pair of a multi-channel audio signal;

means for low-pass filtering an inter-channel correlation (ICC) measure to obtain a long term estimate of a stability ($ICC_{LP}$) of an ICTD parameter when a reliable ICTD estimate is obtained for a frame m;

means for using said stability estimate ($ICC_{LP}$) to determine a hysteresis period, during which a previously obtained reliable ICTD estimate is used, when reliable ICTD estimates are not obtained; and means for setting the ICTD to zero if reliable ICTD estimates are not obtained within the hysteresis period.

8. The apparatus of claim 7, wherein the means for filtering the ICC comprises a first order IIR filter where the filter coefficient is dependent on the current ICC value relative to the last filtered ICC value.

9. The apparatus of claim 7, wherein the hysteresis period is adaptive.

10. The apparatus of claim 9, wherein the hysteresis period depends on the stability estimate ($ICC_{LP}$) such that when $b<ICC_{LP}<a$, where a and b are predetermined constants, an increasing number of frames is applied for decreasing $ICC_{LP}$.

11. The apparatus of claim 7, wherein the hysteresis period $N_{HO}$ is determined as:

$$N_{HO}=\max(0,\min(N_{HOmax},\lfloor c+d\cdot ICC_{LP}(m)\rfloor)),$$

where $ICC_{LP}(m):=ICC_{LP}(m-1)$ is a low-pass filtered inter-channel correlation for frame m−1, and $N_{HOmax}$, c and d are predetermined constants.

12. A multi-channel audio encoder comprising the apparatus of claim 7.

13. An apparatus for determining an adaptive hysteresis for inter-channel time difference (ICTD) parameter in parametric audio coding, the apparatus comprising:

memory; and processing circuitry, wherein the apparatus is configured to:

obtain an ICTD estimate between a channel pair of a multi-channel audio signal;

low-pass filter an inter-channel correlation (ICC) measure to obtain a long term estimate of a stability ($ICC_{LP}$) of an ICTD parameter when a reliable ICTD estimate is obtained for a frame m;

use said stability estimate ($ICC_{LP}$) to determine a hysteresis period, during which a previously obtained reliable ICTD estimate is used, when reliable ICTD estimates are not obtained; and set the ICTD to zero if reliable ICTD estimates are not obtained within the hysteresis period.

14. The apparatus of claim 13, wherein the apparatus comprises a first order IIR filter where the filter coefficient is dependent on the current ICC value relative to the last filtered ICC value.

15. The apparatus of claim 13, wherein the hysteresis period is adaptive.

16. The apparatus of claim 15, wherein the hysteresis period depends on the stability estimate ($ICC_{LP}$) such that when $b<ICC_{LP}<a$, where a and b are predetermined constants, an increasing number of frames is applied for decreasing $ICC_{LP}$.

17. The apparatus of claim 13, wherein the hysteresis period $N_{HO}$ is determined as:

$$N_{HO}=\max(0,\min(N_{HOmax},\lfloor c+d\cdot ICC_{LP}(m)\rfloor)),$$

where $ICC_{LP}(m):=ICC_{LP}(m-1)$ is a low-pass filtered inter-channel correlation for frame m−1, and $N_{HOmax}$, c and d are predetermined constants.

18. A multi-channel audio encoder comprising the apparatus of claim 13.

* * * * *